(12) United States Patent
Block et al.

(10) Patent No.: US 6,905,576 B1
(45) Date of Patent: Jun. 14, 2005

(54) METHOD AND SYSTEM FOR PRODUCING SILANE

(75) Inventors: Hans-Dieter Block, Leverkusen (DE); Hans-Joachim Leimkühler, Leverkusen (DE); Dirk Müller, Gladbach, DE (US); Johannes-Peter Schäfer, Kürten (DE); Georg Ronge, Düsseldorf (DE)

(73) Assignee: SolarWorld AG, Bonn (DE)

(*) Notice: Subject to any disclaimer, the term of this patent is extended or adjusted under 35 U.S.C. 154(b) by 0 days.

(21) Appl. No.: 09/868,792

(22) PCT Filed: Dec. 14, 1999

(86) PCT No.: PCT/EP99/09915

§ 371 (c)(1),
(2), (4) Date: Jun. 21, 2001

(87) PCT Pub. No.: WO00/39027

PCT Pub. Date: Jul. 6, 2000

(30) Foreign Application Priority Data

Dec. 14, 1999 (DE) .......................................... 198 60 146

(51) Int. Cl.[7] .............................. B01D 3/34; B01D 5/00; B01V 8/02; C01B 33/04; C01B 33/107

(52) U.S. Cl. .......................... 203/29; 202/154; 202/155; 202/172; 202/186; 202/158; 203/41; 203/73; 203/77; 203/87; 203/DIG. 6; 422/211; 423/342; 423/347

(58) Field of Search ....................... 203/29, 41, DIG. 6, 203/87, 73, 74, 77, 100; 202/158, 186, 153–155, 172; 423/342, 347; 422/211

(56) References Cited

U.S. PATENT DOCUMENTS

| | | | |
|---|---|---|---|
| 2,834,648 A | * | 5/1958 | Bailey et al. ............... 423/342 |
| 3,968,199 A | | 7/1976 | Bakay ........................ 423/347 |
| 4,099,936 A | * | 7/1978 | Tarancon .................... 95/127 |
| 4,113,845 A | * | 9/1978 | Litteral ..................... 423/342 |
| 4,340,574 A | * | 7/1982 | Coleman .................... 423/347 |
| 4,536,373 A | | 8/1985 | Jones, Jr. .................... 422/211 |
| 4,610,858 A | * | 9/1986 | Yamada et al. ............. 423/342 |
| 4,613,491 A | | 9/1986 | Jung et al. .................. 423/347 |
| 4,676,976 A | | 6/1987 | Toba et al. .................. 424/485 |
| 4,701,430 A | | 10/1987 | Jung et al. ................... 502/62 |
| 5,026,459 A | | 6/1991 | Quang et al. ............... 202/158 |
| 5,026,533 A | | 6/1991 | Matthes et al. ............. 423/342 |

(Continued)

FOREIGN PATENT DOCUMENTS

| | | |
|---|---|---|
| DE | 3500318 | 8/1985 |
| EP | 2118725 | 7/1972 |
| EP | 0 063 067 | 10/1982 |
| EP | 0 093 640 | 11/1983 |
| EP | 0 458 472 | 3/1995 |
| EP | 0 476 938 | 3/1995 |
| EP | 0 950 433 | 10/1999 |
| EP | 0 665 041 | 3/2001 |
| FR | 2261977 | 9/1975 |
| JP | 1-317114 | 12/1989 |
| WO | 94/08681 | 4/1994 |
| WO | 94/08682 | 4/1994 |
| WO | 97/26971 | 7/1997 |

OTHER PUBLICATIONS

Perry et al Distillstion, 1965, p. 299.*
**Patent Abstracts of Japan, vol. 011, No. 013 (C–397), Jan. 14, 1987, & JP 61 191513 A (Denki Kagaku Kogyo KK), Aug. 26, 1986.

*Primary Examiner*—Virginia Manoharan
(74) *Attorney, Agent, or Firm*—McGlew and Tuttle, P.C.

(57) ABSTRACT

This invention relates to a continuous process for the preparation of silane by catalytic disproportionation of trichlorosilane in a reactive/distillative reaction zone having a catalyst bed of catalytically active solid.

12 Claims, 3 Drawing Sheets

U.S. PATENT DOCUMENTS

| | | | |
|---|---|---|---|
| 5,073,236 A | 12/1991 | Gelbein et al. | 203/29 |
| 5,130,102 A | 7/1992 | Jones, Jr. | 422/191 |
| 5,211,931 A * | 5/1993 | Allen et al. | 423/347 |
| 5,275,790 A | 1/1994 | Buchholz et al. | 422/217 |
| 5,308,451 A | 5/1994 | Carland | 202/158 |
| 5,417,938 A | 5/1995 | Shelden et al. | 422/196 |
| 5,470,542 A | 11/1995 | Stringaro | 422/211 |
| 5,473,082 A | 12/1995 | Shelden et al. | 549/258 |
| 5,493,059 A | 2/1996 | Sanfilippo et al. | 468/697 |
| 5,536,699 A | 7/1996 | Ghelfi et al. | 502/400 |
| 5,550,298 A | 8/1996 | Shelden et al. | 568/494 |
| 5,593,548 A | 1/1997 | Yeoman et al. | 203/29 |
| 5,601,797 A | 2/1997 | Gentry | 423/659 |
| 5,730,843 A | 3/1998 | Groten et al. | 202/158 |
| 5,776,320 A | 7/1998 | Marion et al. | 203/29 |
| 5,779,993 A | 7/1998 | Gentry | 422/191 |
| 6,054,630 A | 4/2000 | Mikitenko et al. | 585/670 |
| 6,072,091 A | 6/2000 | Cosyns et al. | 585/259 |
| 6,084,141 A | 7/2000 | Mikitenko et al. | 585/263 |

* cited by examiner

METHOD AND SYSTEM FOR PRODUCING SILANE

The present invention relates to a continuous process for the preparation of silane $SiH_4$ by catalytic disproportionation of trichlorosilane $SiHCl_3$ to form $SiH_4$ and silicon tetrachloride $SiCl_4$. The invention further relates to an installation for carrying out the process.

$SiH_4$ is a very suitable starting material from which, optionally after further purification, very pure silicon of semiconductor grade can be deposited by thermal decomposition. There is a strongly increasing demand for ultrapure silicon and thus for pure silane which is recognized and utilized more and more as a very suitable source of ultrapure silicon.

From the silane preparation processes described in the literature, the trichlorosilane disproportionation is economically advantageous. The use of amines, especially tertiary amines and hydrochlorides thereof and quaternary ammonium chlorides, both in liquid form (DE 3 500 318) and in solid form, e.g. bound to solid supports, as catalysts is known to accelerate the disproportionation of the trichlorosilane in an economically advantageous manner. The use of amines bound to solid supports (U.S. Pat. Nos. 4,701,430, U.S. 5,026,533, DE 3 500 318, DE 3 311 650) is therefore preferred because the contamination of the reacting silane/chlorosilane gas/liquid phase with amines can be avoided in this way.

A disadvantage of the liquid catalysts selected in some other existing processes is that they are discharged from the reaction section slowly over time, because they can never be separated completely from the reaction products. The entrained amounts of catalyst give rise to problems in downstream process steps or, in a circulation system, also in upstream process steps, because they can accumulate at certain points in the system where they can catalyze undesired reactions, for example. In addition, it is not possible to achieve a very uniform distribution of a liquid catalyst in the column, rather the catalyst will locally concentrate owing to its specific vapor pressure. This problem is in no way solved, but at best alleviated, by the use of two catalysts having different boiling points as proposed in DE 3 500 318.

Attempts have already been made to conduct the disproportionation, which, according to the prior art, is a multistep process, for example a two-step process, in one step applying the principle of reactive distillation. Reactive distillation is characterized by a combination of reaction and distillative separation in a single apparatus, in particular a column. The continuous distillative removal of the lowest-boiling component respectively in each element of space ensures that an optimum difference between the equilibrium state and the actual content of lower-boiling components or lowest-boiling component is always maintained, resulting in a maximum reaction rate (JP-01 317 114).

DE 2 507 864 discloses another process for the preparation of silane which comprises introducing trichlorosilane into a bed of an anion exchange resin which is insoluble in the reaction medium and contains tertiary amino or quaternary ammonium groups bonded to a carbon atom, maintaining the resin bed at a temperature sufficient to cause trichlorosilane to be disproportionated to form products which rise in the bed, and silicon tetrachloride which condenses and flows to the column bottom, and maintaining the top part of the bed at a temperature above the boiling point of silane and below the boiling point of monochlorosilane, and recovering from the bed silane which is virtually chlorosilane-free.

This process is distinguished from the other known processes by the following features:

(1) it can be carried out in a single apparatus, i.e. the desired, enriched products silane and silicon tetrachloride can be taken off at different points of the same apparatus, and therefore requires a comparatively low expenditure in terms of apparatus and energy;

(2) it makes it possible to obtain the products silane (in concentrations of between 96 to 98% of $SiH_4$) and silicon tetrachloride (in concentrations of e.g. between 70 to 80% of $SiCl_4$) in comparatively high concentration without the need for further auxiliary units;

(3) owing to the solid insoluble catalyst (hereinafter called catalytically active solid), the introduction of impurities from the catalyst into the reaction mixture is minimized, the separation of the catalyst is significantly easier than in the case of the liquid soluble catalysts, and the accumulation of volatile, liquid catalysts in certain column parts is strictly avoided; and (4) the amount of energy required for the separation of the silanes or chlorosilanes formed in the individual equilibrium stages of the disproportionation is minimized by the principle of reactive rectification.

A grave disadvantage of this process described in DE 2 507 864 is that the amount of energy utilized for the separation of the silanes or chlorosilanes has to be completely removed at a very low temperature level matched to the condensation temperatures. In fact, DE 2 507 864 requires that the temperature at the top of the column be below the condensation temperature of monochlorosilane $SiH_3Cl$ and that the temperature in the trichlorosilane $SiHCl_3$ feed zone be such that trichlorosilane can be evaporated. Thus, the energy required for evaporating the various chlorosilanes and the silane in the individual sections of the column is actually removed at a temperature below the condensation temperature of the monochlorosilane, i.e. from below $-50°$ C. to $-120°$ C. However, heat removal at a low temperature level is known to be costly and requires additional energy, and indeed the lower the temperature to be set for the coolant, the higher the amount of additional energy required.

It is an object of the invention to provide a continuous process and an installation for the preparation of silane by catalytic disproportionation of trichlorosilane to form silane and silicon tetrachloride in which the disproportionation proceeds in a reactive/distillative manner over catalytically active solids, silane and silicon-tetrachloride are recovered in comparatively high concentration, and the disproportionated products are separated and condensed with minimal expenditure. The heat is to be removed essentially at a temperature level at which the coolant can be used which has a temperature that can be achieved quite easily, and the apparatus and energy required for refrigeration to remove the heat for condensing the products is to be reduced.

A continuous process for the preparation of silane $SiH_4$ by catalytic disproportionation of trichlorosilane $SiHCl_3$ to form $SiH_4$ and silicon tetrachloride $SiCl_4$ in a reactive/distillative reaction zone comprising a catalyst bed of catalytically active solid, into which $SiHCl_3$ is introduced and from which lower-boiling $SiH_4$-containing product formed in the catalyst bed is taken off and condensed in an overhead condenser and discharged as final product, and in which $SiCl_4$ is formed as higher-boiling bottom product, is provided which is characterized in that the lower-boiling product mixture, which has formed in the catalyst bed at a pressure of 1 to 50 bar, is subjected to an intermediate condensation at a temperature in the range from $-25°$ C. to 50° C., and the SiH$_4$-containing product mixture which is not condensed in the intermediate condensation is condensed in the overhead condenser.

Suitable catalytically active solids are known and also described in DE 2 507 864. For example, they are solids which contain, on a framework of divinylbenzene-crosslinked polystyrene, amino or alkyleneamino groups such as dimethylamino, diethylamino, ethylmethylamino, di-n-propylamino, di-i-propylamino, di-2-chloroethylamino, di-2-chloropropylamino groups and hydrochlorides thereof, or trialkylammonium groups formed therefrom by methylation, ethylation, propylation, butylation, hydroxyethylation or benzylation, with chloride counterion. In the case of quaternary ammonium salts or protonated ammonium salts it is of course also possible to introduce into the process according to invention catalytically active solids containing other anions, e.g. hydroxide, sulfate, hydrogensulfate, bicarbonate etc., in the course of time, these are, however, inevitably converted into the chloride form under the reaction conditions, which also applies to organic hydroxyl groups.

Other suitable solids are those composed of a polyacrylic acid framework, especially a polyacrylamide framework, to which e.g. trialkylbenzylammonium is attached via an alkyl group.

Another group of catalytically active solids which is suitable for the process according to the invention are those which have sulfonate groups attached to a divinylbenzene-crosslinked polystyrene framework, balanced with tertiary or quaternary ammonium groups as cations.

Macroporous or mesoporous exchange resins are usually more suitable than gel resins. Other suitable catalytically active solids are those which carry organic amino groups of the abovementioned type, e.g. those which have a 3-siloxypropyldimethylamino group, attached to a solid inorganic framework such as silica or zeolite (U.S. Pat. No. 4,701,430). Suitable catalytically active solids are usually employed in the form of beads.

A number of suitable activation and pretreatment methods for these catalysts are described in the literature.

In a preferred embodiment of the process according to the invention, the SiH$_4$-containing product mixture is separated from the higher-boiling chlorosilanes present in the mixture prior to condensation of the final SiH$_4$ product so as to increase the SiH$_4$ concentration. The separation is preferably conducted at a pressure which his higher than that employed in the intermediate condensation, so that the concentration of the SiH$_4$ can be achieved at a higher temperature level and thus less product is to be condensed at a higher SiH$_4$ concentration. Chlorosilane obtained in the separation is conveniently returned to the reactive/distillative reaction zone.

The invention and further embodiments thereof are illustrated below with reference to installations for carrying out the process and corresponding examples.

Figure 1:
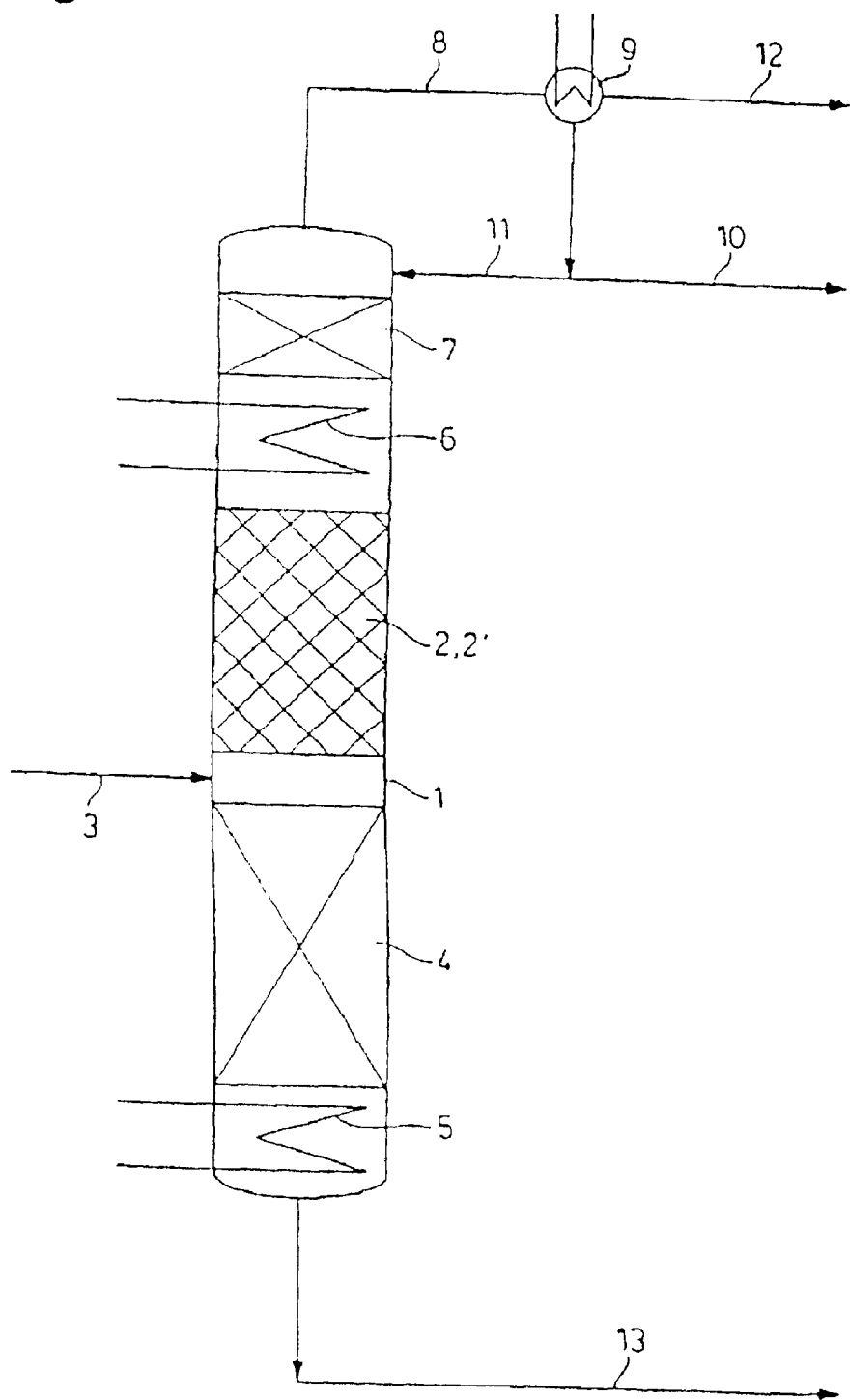
FIG. 1 shows an installation for the production of silane comprising a reactive/distillative reaction zone, an intermediate condenser, integrated rectifying section and, downstream of the rectifying section, an external overhead condenser for condensing silane.

FIG. 1 shows a flow chart for an installation for the continuous production of silane SiH$_4$ which comprises an essentially vertical reaction column 1 having a reactive/distillative reaction zone 2 for the catalytic disproportionation of trichlorosilane SiHCl$_3$. The disproportionation in the reaction zone 2 is conducted in a catalyst bed 2' which is made of a randomly packed layer of solid bodies of catalytically active solid and through which the disproportionation products can flow. Instead of a randomly packed layer, the reaction zone may also contain catalyst bodies in a structured packing. Catalytically active solids are preferably those described in DE 2 507 864, as mentioned above.

The SiHCl$_3$ is introduced into the reaction column 1 via an inlet 3 which opens into the column at an appropriate point. In the reaction zone 2, disproportionation of SiHCl$_3$ yields a lower-boiling SiH$_4$-containing product mixture which ascends in the reaction zone and a higher-boiling SiH$_4$-containing condensate which descends in the reaction zone.

In the reaction column 1, the higher-boiling SiCl$_4$-containing condensate exiting from the reaction zone is introduced into a distillative stripping section 4 which is arranged below the reactive/distillative reaction zone 2. From a bottom evaporator 5, arranged below the stripping section, silicon tetrachloride SiCl$_4$ is discharged as bottom product via an outflow 13. The amount of heat required for the disproportionation of SiHCl$_3$ is introduced into the reaction column by means of the beat exchanger 5.

Above the reaction zone, an intermediate condenser 6 is provided for the lower-boiling SiH$_4$-containing product mixture ascending in the reaction zone 2. In this condenser, the SiH$_4$ concentration in the lower-boiling SiH4-containing product mixture is increased by partial condensation of higher-boiling components of the lower-boiling SiH$_4$-containing product mixture at a temperature between −25° C. and 50° C., preferably between −5° C. and 40° C. The heat of condensation is dissipated by a coolant flowing through the intermediate condenser 6. The lower-boiling product fractions of the lower-boiling SiH$_4$-containing product mixture which are not condensed in the intermediate condenser 6 are introduced into a rectifying section 7 which is arranged downstream of the intermediate condenser in the direction of flow of the ascending product fractions, and further concentrated. In the embodiment of FIG. 1, the rectifying section 7 is inserted above the intermediate condenser 6 and integrated into the reaction column 1. Alternatively, the rectifying section can be arranged outside the reaction column. The product mixture from the rectifying section 7 is finally taken off at the top of the reaction column via an outlet 8 and introduced into an overhead condenser 9 in which it is condensed and discharged in liquid form, as final SiH$_4$ product obtained, via an SiH$_4$ product line 10. Part of the recovered SiH$_4$ is returned to the top of the reaction column 1 via a branch line 11. The branch line 11 opens into the column above the rectifying section 7.

Residual inert gas fractions obtained in the overhead condenser 9 during SiH$_4$ condensation are discharged from the overhead condenser via an inert gas line 12.

According to the invention, in the embodiment of FIG. 1, condensation of the product taken off at the top of the reaction column 1 in the overhead condenser 9 produces silane in a concentration of >70%, preferably >90%, particularly preferably >98%. Following disporportionation of SiHCl$_3$ in the reactive/distillative reaction zone 2, the lower-boiling SiH$_4$-containing product which is ascending from the reaction zone to the top of the reaction column 1 is subjected to an intermediate condensation. Instead of one intermediate condenser, as described in the embodiment above, a plurality of intermediate condensers can be inserted. The intermediate condenser(s) 6 operate at temperatures at which the removal of the heat of condensation by means of a coolant is still possible between −25° C. and 50° C., preferably between −5° C. and 40° C., so that only a considerably smaller, uncondensed fraction of the $SiH_4$-containing product mixture has to be transferred to a rectifying section 7 equipped with conventional distillation internals such as trays and packings, and only the gas fraction exiting the rectifying section has to be condensed in the overhead condenser 9 at very low temperatures in a final step.

Moreover, the rectifying section 7 including its associated overhead condenser 9 can also be arranged externally outside the reaction column 1.

With conventional pressures of 1 to 50 bar, preferably 1 to 10 bar, and the desired purities of the silane product, the overhead condenser 9 has to be operated below the condensation temperatures of <−40° C., in most cases even below <−60° C. By installing purely distillative separation sections upstream of the condensation of the final silane product and arranging a distillative stripping section 4 above the bottom evaporator 5, the energy introduced is used several times, i.e. (1) for purifying and concentrating the silane in the rectifying section 7, (2) for continuous distillative removal of those intermediates or products which are lower-boiling under the respective local conditions in the apparatus and thus for increasing the reaction rate in the reactive/distillative reaction zone 2, and (3) for purifying the $SiCl_4$ in the lower part of the reaction column. A further advantage compared to the process disclosed in DE 2 507 864 results from the distillative stripping section 4 and the resulting possibility of purifying the $SiCl_4$ dicharged at the bottom, because a downstream $SiCl_4$ purification column can be omitted, thus reducing the energy required for this process step.

Figure 2:
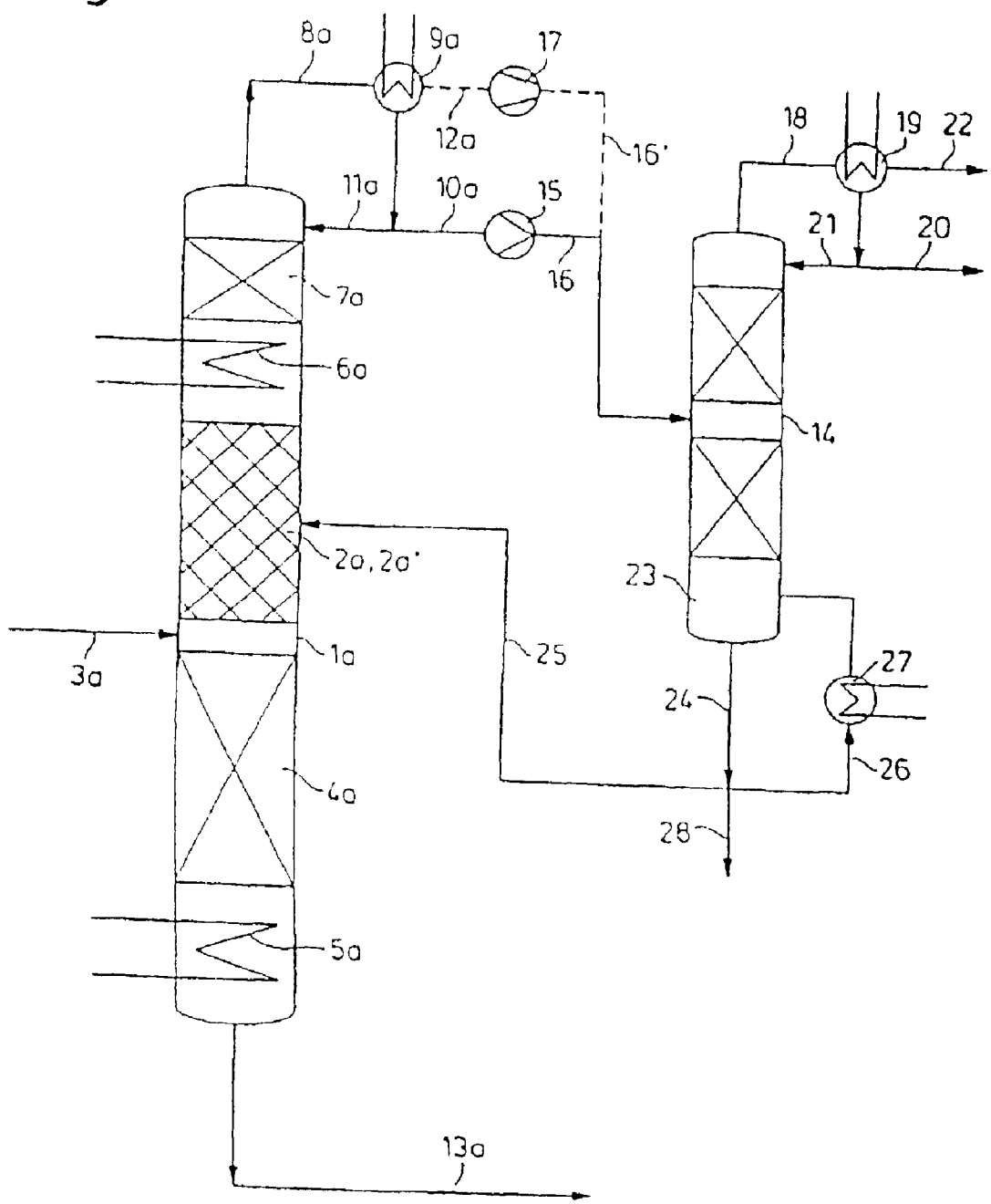
FIG. 2 shows an installation for the production of silane comprising a reactive/distillative reaction zone, an intermediate condenser, integrated rectifying section and, downstream of the rectifying section, an external condenser, a separation column downstream of the latter, and an overhead condenser for condensing silane which is connected to the separation column.

Another embodiment is shown in FIG. 2. In this embodiment, the construction of the reaction column 1a is similar to the design of the reaction column 1 of FIG. 1. Therefore, all equipment parts designed in analogy to the parts of FIGS. 1 and 2 are given the same reference symbols, but are represented with the added index "a" to distinguish them.

In the embodiment of FIG. 2, the separation column 14 is arranged downstream of a condenser 9a which is located between rectifying section 7a and separation column 14. In the condenser 9a, all or part of the uncondensed $SiH_4$-containing product mixture exiting the rectifying section 7a via the outlet 8a is condensed prior to entering the separation column 14, so that a product mixture which is more concentrated in $SiH_4$ is introduced into the separation column 14. Part of the condensate obtained in the condenser 9a is returned, via a branch line 11a, to the reaction column 1a above its rectifying section 7a. The remaining part of the condensate is compressed by means of a liquid pump 15 and transferred to the separation column 14 via a pressure line 16. If only part of the product mixture exiting the rectifying section 7a is condensed in the condenser 9a, the remaining part is sucked off via an outlet 12a by means of a compressor 17, compressed and introduced into the separation column 14 via a pressure line 16'. Alternatively, the stream 12a can be transferred to a workup step.

An outlet 18 leads from the top of the separation column 14 to an overhead condenser 19 from which the condensed silane obtained is discharged in an $SiH_4$ product line 20, Part of the liquid silane is returned to the separation column 14 in a branch line 21. Inert gases obtained in the overhead condenser are discharged via an inert gas line 22.

The bottom product of the separation column 14 is discharged from the bottom 23 of the separation column via a bottom outlet 24. Part of the bottom product flows back into the reaction column 1a via the branch line 25, another part is returned to the bottom zone of the separation column 14 via a return line 26 after evaporation in the heat exchanger 27, another part can be bled off (28) completely from the plant in order to remove impurities.

In the embodiment of FIG. 2, a liquid or gaseous overhead product having a lower silane purity of between 25% to 90% is produced by reducing the reflux compared to the embodiment of FIG. 1 and complete or partial condensation in the condenser 9a so as to increase the condensation temperature in the overhead condenser 9a and to reduce further the condensation energy which has to be removed at a very low temperature. This overhead product is then purified further by separation in the downstream separation column 14, where the same pressure or preferably a higher pressure than in the reaction column 1a, preferably 15 bar to 100 bar, is set, so that the separation column 14 operates at higher temperatures than the reaction column 1a, based on the same composition. In this variant too, the bottom product of the separate separation column 14 may contain large proportions of trichlorosilane, dichlorosilane and monochlorosilane, depending on the operating conditions selected. All or part of the bottom product is returned to the reaction column 1a via the branch line 25 connected to the outlet 24. If necessary, impurities can be removed (28) from the system by bleeding off a part-stream.

The feed(s) introduced into the reaction column via the inlets 3, 3a and 25, if desired after preliminary reaction in a preliminary reactor, are introduced into the stripping section 4, 4a, or between reactive/distillative reaction zones 2, 2a and stripping section, or into the reactive-distillative reaction zone, or into the overhead condenser 6, 6a, depending on the respective composition.

The process according to the invention is conducted at pressures from 1 to 50 bar, preferably 1 to 10 bar, particularly preferably 2.8 to 5 bar, in the reactive/distillative reaction zone using catalytically active solids. The temperatures in the system are varied by means of the pressures. The temperatures in that part of the reactive/distillative reaction section in which the disporportionation takes place are between 30° C. and 180° C., preferably between 50° C. and 110° C. The temperature which is to be set in each case depends on the range in which the catalytically active solids are stable.

A disadvantage of the previously described processes for the distillative separation of pure silane with concomitant reaction is the large amount of heat which has to be removed at the condensation temperature of the silane at a given pressure, i.e. for example at −50° C. to −120° C. As mentioned above, condensation at these temperatures is economically very unfavorable. As the amount of heat which has to be removed during operation without intermediate condenser is of the same order as the amount of heat introduced at the bottom of the reaction column, the heat removal costs should generally be considerably higher than the heat introduction costs. This is largely avoided by the intermediate condensation according to the invention. For example, depending on the system pressure, 60% to 97% of the heat of condensation can be removed when using a coolant having a temperature of 25° C. for the intermediate condensation to cool down the gas stream exiting above the intermediate condenser(s) to 40° C., so that only 3% to 40% of the heat of condensation have to be removed at the condensation temperature of the silane. Nevertheless, purification of the silane to give an $SiH_4$ content of preferably more than 90%, particularly preferably more than 98%, is possible above the intermediate condenser in a separation column placed directly above the intermediate condenser and/or in a separate separation column, the condenser for condensing silane at the head of the separation column being operated at a coolant temperature below the condensation temperature of the silane.

Owing to the intermediate condensation, the conditions in the reaction areas in the reactive/distillative reaction zone remain essentially unchanged compared to a reaction column without intermediate condenser, so that intermediates and products formed can still be separated effectively by distillation after their formation. It is only above the intermediate condenser that the vapor and liquid streams are significantly reduced compared to the rest of the system. However, they are sufficient to ensure that the silane which is present in small amounts compared to the bottom product of the reaction column, $SiCl_4$, and whose boiling point differs considerably from the remaining components, is concentrated in a separation column placed on top or in a separate separation column, achieving purities of >50%, particularly preferably >98%.

Preferred internals used in the reaction columns of the installation according to the invention are those which ensure an intensive mass transfer between gas phase and liquid phase and simultaneously allow an intensive contact with the solid catalyst. Owing to the combination of mass transfer and reaction, a sufficient distance from the respective reaction equilibrium is ensured in the reactive/distillative reaction zone by rapid separation of products formed, so that the reaction always proceeds with a high reaction rate. Examples of such column internals are trays, structured or random packings for introducing heterogeneous catalysts, as described, for example, in the following publications: EP 670 178, EP 461 855, U.S. Pat. Nos. 5,026,459, U.S. 4,536,373, WO 94/08 681, WO 94/08 682, WO 94/08 679, EP 470 655, WO 97/26 971, U.S. Pat. No. 5,308,451, EP 755 706, EP 781 829, EP 428 265, EP 448 884, EP 640 385, EP 631 813, WO 90/02 603, WO 97/24 174, EP 665 041, EP 458 472, EP 476 938 and German Utility Model 298 07 007.3. Alternatively, the solid catalyst can be spread on distillation trays as such or in agglomerated form. When carrying out the process, residence time, catalyst volume and distillative separation effect in the reaction zone are matched to reaction kinetics and mass transfer kinetics, the parameter optimum depending strongly on the boundary conditions, such as the catalyst selected, the system of substances and the pressure and temperature conditions selected.

Alternatively, the catalyst can be introduced into external, optionally thermostatted reactors, alternating between transferring the liquid phase from the reaction column into the reactor and from the reactor back to the column for separation of substances.

In this case, however, it is disadvantageous that products formed generally cannot be separated by distillation as rapidly after their formation as in the case of the abovementioned trays, structured packings and random packings. Decoupling of different temperatures in the column and in external reactions can be achieved by thermostatting the material streams between the column and the reactors.

Figure 3:
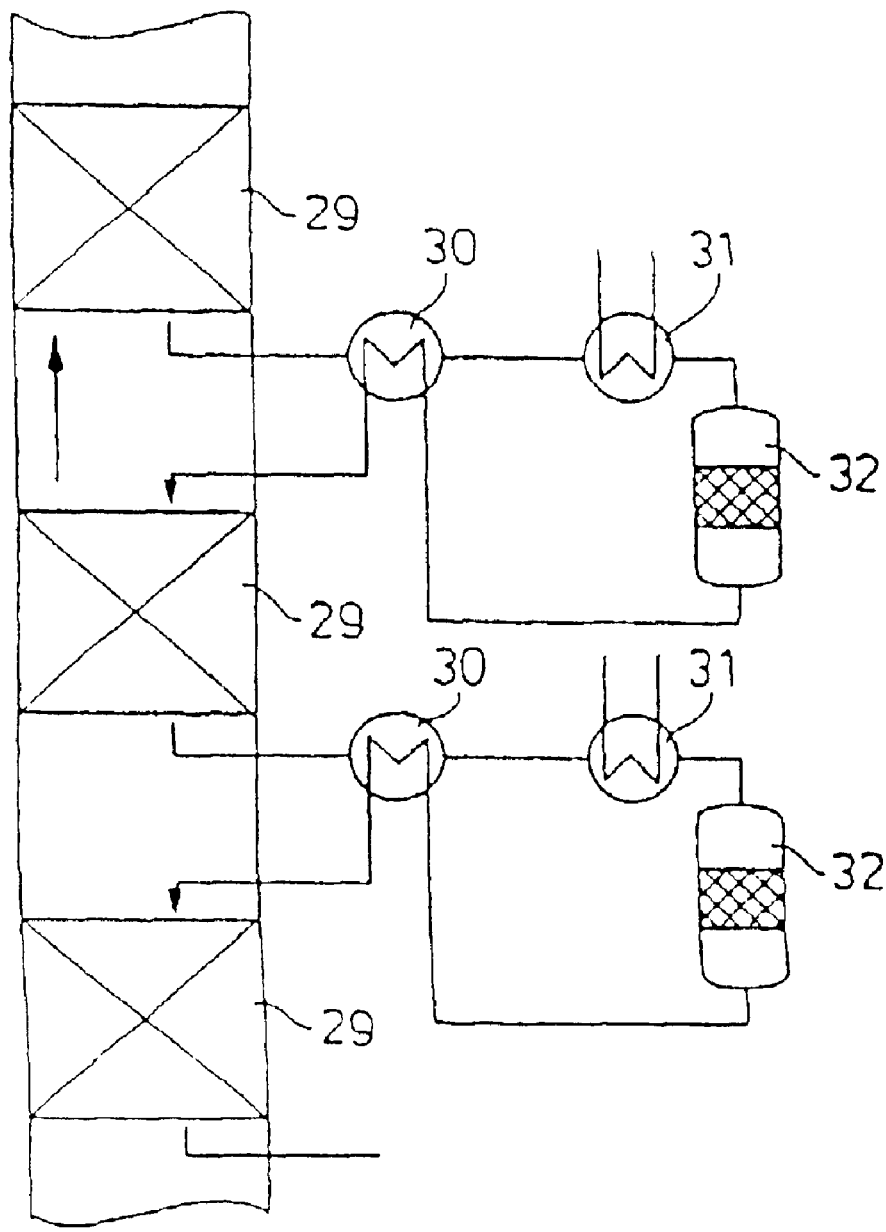
FIG. 3 shows an embodiment with external reactors.

FIG. 3 shows the distillative/reactive reaction zone 2; 2a of FIGS. 1 and 2 for the embodiment having external reactors. The liquid mixture flowing out of a distillative section 29 enters, optionally via heat recovery unit and thermostatting unit 31, a reactor 32 operated in downward or upward flow mode, and is passed on into the subsequent distillative section. The sequence "distillative section/thermostatting unit/reactor" can be repeated on top of one another any number of times.

According to the invention, the disproportionation which is taking place in the reaction zone of the reaction columns is supplemented by a purely distillative separation and purification of the silane- or silicon tetrachloride-containing products to be discharged at the top and at the bottom of the reaction columns. The distillative separation is carried out by means of conventional internals for pure distillation such as trays, structured packings and random packings. For the exiting higher-boiling $SiCl_4$ component it is convenient to produce a substantially concentrated silicon tetrachloride bottom product containing more than 70% of $SiCl_4$, preferably more than 95% of $SiCl_4$, particularly preferably more than 99% of $SiCl_4$, by purely distillative separation below the reactive/distillative reaction zone in the bottom part of the reaction column, and to take off this product at the bottom of the reaction column.

List of Reference Symbols

Reaction column 1, 1a
Reactive/distillative reaction zone 2, 2a
Catalyst bed 2', 2a'
$SiHCl_3$ inlet 3, 3a
Distillative stripping section 4, 4a
Bottom evaporator 5, 5a
Intermediate condenser 6, 6a
Intermediate condenser 7, 7a
Vapor outlet 8, 8a
Overhead condenser 9, 9a
$SiH_4$ product line 10, 10a
Branch line 11, 11a
Inert gas line 12, 12a
$SiCl_4$ outflow 13, 13a
Separation column 14
Liquid pump 15
Pressure line 16
Compressor 17
Outlet 18
Overhead condenser 19
$SiH_4$ product line 20
Branch line 21
Inert gas line 22
Bottom 23
Bottom outlet 24
Branch line 25
Return line 26
Heat exchanger 27
Bleed-off 28
Distillation section 29
Heat recovery unit 30
Thermostatting unit/heat exchanger 31
Reactor 32

What is claimed is:

1. A continuous process for the preparation of silane of formula $SiH_4$ by catalytic disproportionation of trichlorosilane of formula $SiHCl_3$ to form $SiH_4$ and silicon tetrachloride of formula $SiCl_4$ in a reactive/distillative reaction zone comprising (a) introducing $SiHCl_3$ into a reactive/distillative reaction zone comprising a catalyst bed of a catalytically active solid at a pressure of 1 to 50 bar to form a lower-boiling $SiH_4$-containing product and a higher-boiling $SiCl_4$-containing bottom product;

(b) removing the lower-boiling $SiH_4$-containing product from the reactive/distillative reaction zone and condensing the $SiH_4$-containing product in an intermediate condensation at a temperature in the range from −5° C. to 40° C.;

(c) introducing the lower-boiling $SiH_4$-containing product which is not condensed in the intermediate condensation into a rectifying section and increasing the $SiH_4$-concentration in the $SiH_1$-containing product which is not condensed in the intermediate condensation;

(d) further condensing any $SiH_4$-containing product that is not condensed in the intermediate condensation and concentrated in the rectifying section in an overhead condenser from which the $SiH_4$-containing product is discharged as final product.

2. A process according to claim 1 wherein the pressure in the catalyst bed is from 1 to 10 bar.

3. A process according to claim 1 wherein the $SiH_4$-containing product discharged is separated in the overhead condenser at a pressure higher than the pressure employed in the intermediate condensation.

4. A process according to claim 1 wherein all or part of the chlorosilane is returned to the reactive/distillative reaction zone.

5. A process for producing silane, the process comprising the steps of:

providing a reactive/distillative reaction zone including a catalyst bed of a catalytically active solid forming a lower-boiling $SiH_4$-containing product and a higher-boiling $SiCl_4$-containing bottom product;

introducing $SiHCl_3$ into the reactive/distillative reaction zone at a pressure of 1 to 50 bar and forming the lower-boiling $SiH_4$-containing product and the higher-boiling $SiCl_4$-containing bottom product;

removing the lower-boiling $SiH_4$-containing product from the reactive/distillative reaction zone;

cooling the $SiH_4$-containing product after said removing in an intermediate condensation with temperatures in the range from −5° C. to 40° C.;

providing a rectifying section;

introducing the lower-boiling $SiH_4$-containing product which is not condensed during said cooling into a rectifying section to increasing a $SiH_4$-concentration in the $SiH_4$-containing product;

condensing the $SiH_4$-containing product from the rectifying section in an overhead condenser form which the $SiH_4$-containing product is discharged as final product.

6. An installation for the continuous preparation of silane of formula $SiH_4$ by catalytic disproportionation of trichlorosilane of formula $SiHCl_3$ to form $SiH_4$ and silicon tetrachloride of formula $SiCl_4$ in a reaction column having (1) a reactive/distillative reaction zone comprising a catalyst bed made of solid bodies of catalytically active solid and through which the disproportionation products and trichlorosilane can flow, (2) an inlet for introducing $SiHCl_3$ into the reactive zone, (3) an overhead condenser connected to the reaction column for condensing the $SiH_4$-containing product that is formed and having an outlet for condensed $SiH_4$ at the overhead condenser, (4) at least one intermediate condenser arranged between the reactive/distillative reaction zone and the overhead condenser, wherein the at least one intermediate condenser is operated at a temperature in the range from −5° C. to 40° C., (5) a rectifying section for increasing the $SiH_4$-concentration in the lower-boiling $SiH_4$-containing product which is not condensed in the at least one intermediate condenser being arranged downstream of the at least one intermediate condenser in a direction of flow of the lower-boiling $SiH_4$-containing product coming from the at least one intermediate condenser, and (6) an outflow for $SiCl_4$ obtained as bottom product, for carrying out the process according to claim 1.

7. An installation according to claim 6 wherein the at least one intermediate condenser is arranged above the catalyst bed.

8. An installation according to claim 6 wherein a separation column for separating $SiH_4$-containing product fractions from higher-boiling chlorosilane components is arranged downstream of the at least one intermediate condenser in a direction of flow of the lower-boiling product mixture coming from the at least one intermediate condenser.

9. An installation according to claim 8 wherein the separation column is arranged downstream of the rectifying section.

10. An installation according to claim 9 wherein the overhead condenser is arranged between the rectifying section and the separation column.

11. An installation according to claim 8 wherein the separation column is operated at a pressure higher than the pressure in the at least one intermediate condenser and the product that is conducted to the separation column is compressed.

12. An installation according to claim 8 wherein a branch line that opens into a reactive/distillative reaction zone of the reaction column is connected to a bottom outlet of the separation column.

* * * * *